May 1, 1956  E. M. RAMBERG  2,744,043
METHOD OF PRODUCING PRESSURE CONTAINERS FOR FLUIDS
Filed Jan. 23, 1950  4 Sheets-Sheet 4
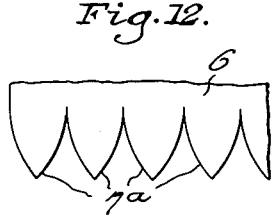
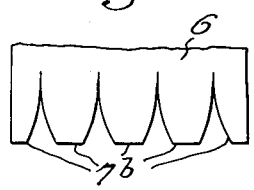
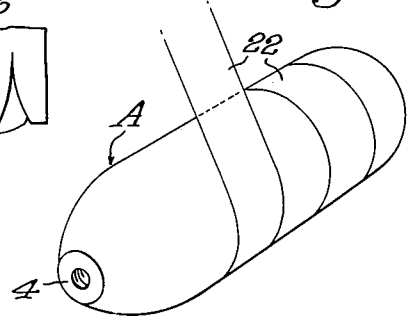
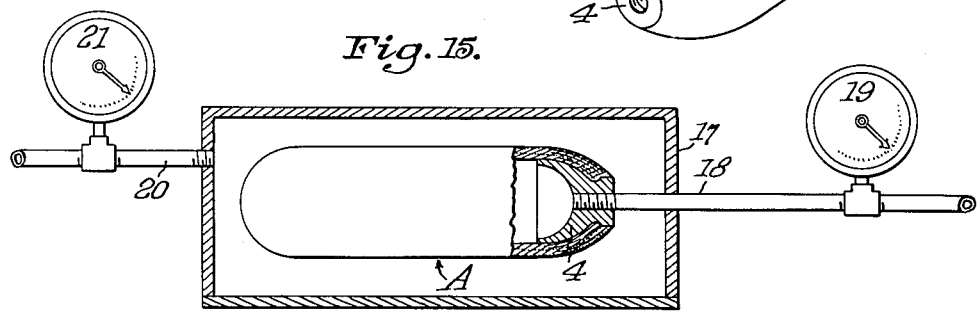
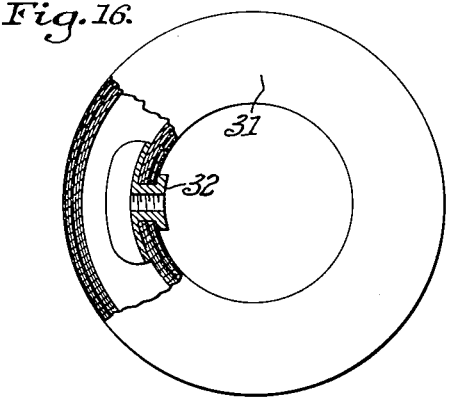
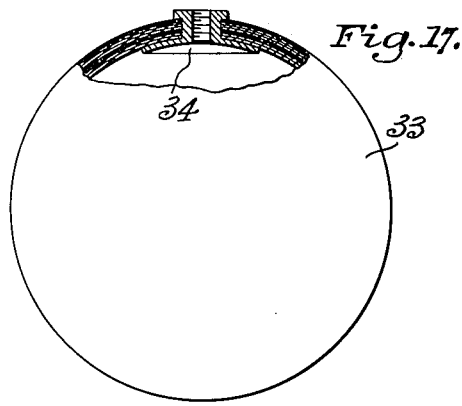
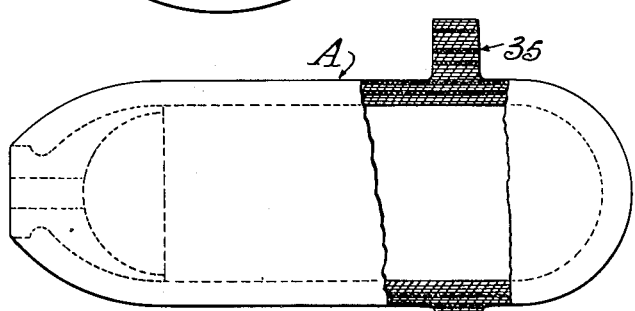
INVENTOR
Einar M. Ramberg
BY Baldwin, Wight + Brown
ATTORNEYS United States Patent Office 2,744,043
Patented May 1, 1956

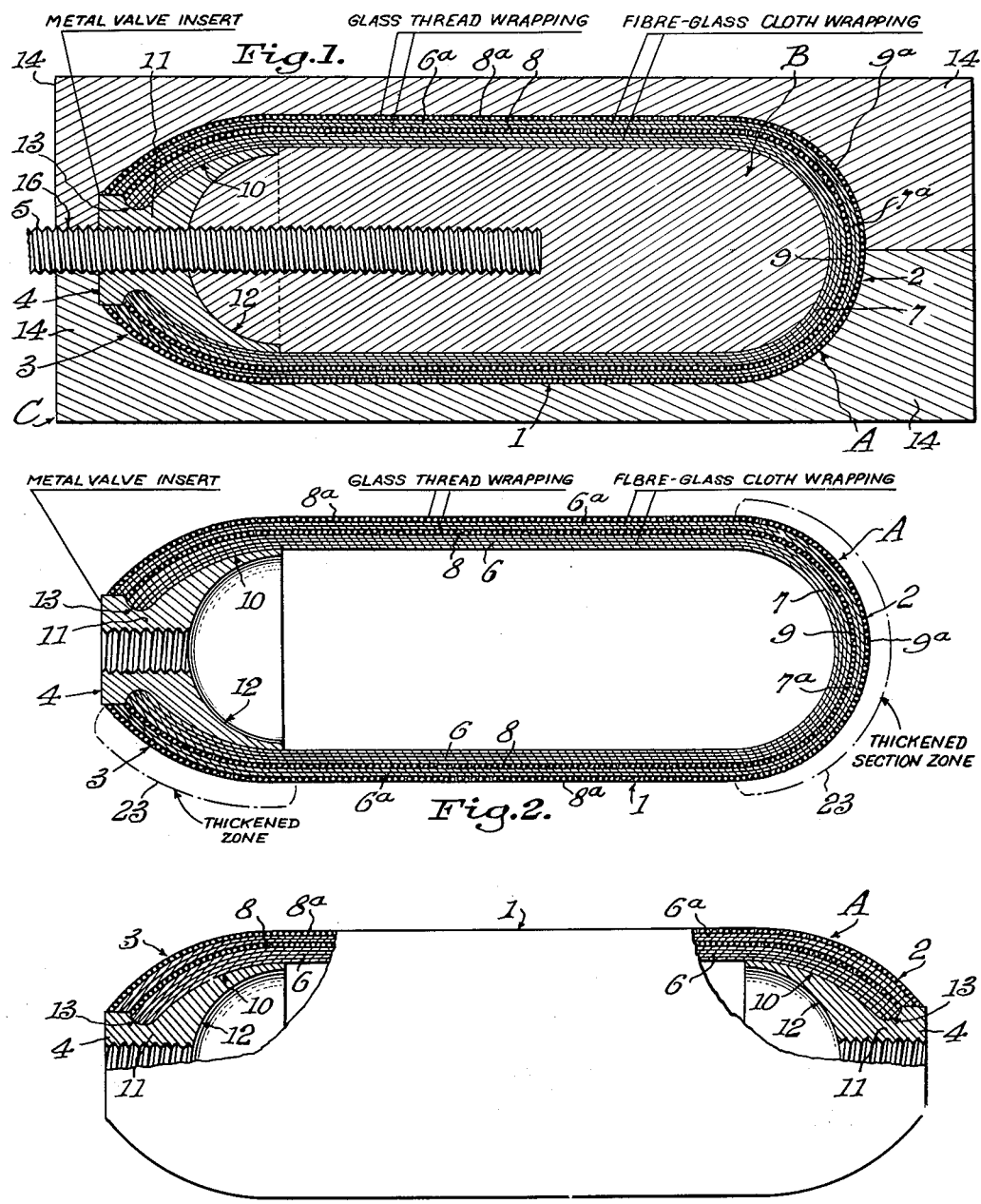

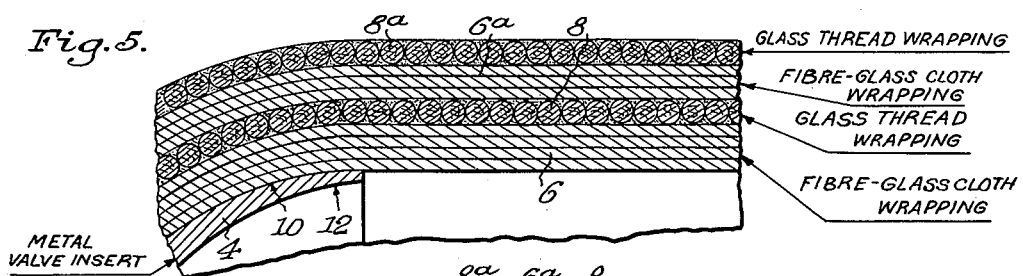
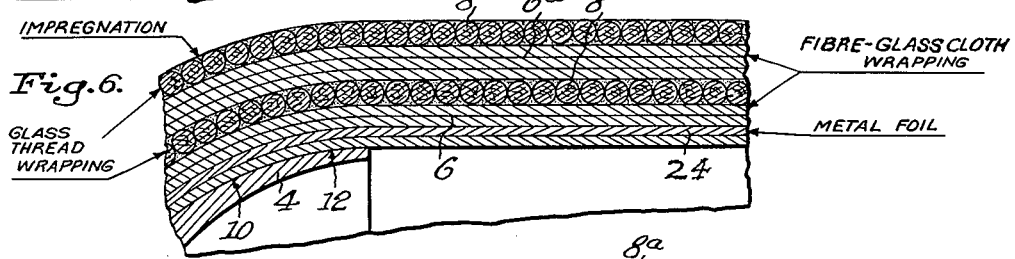
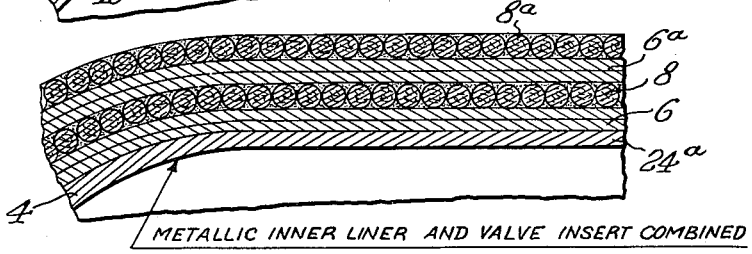
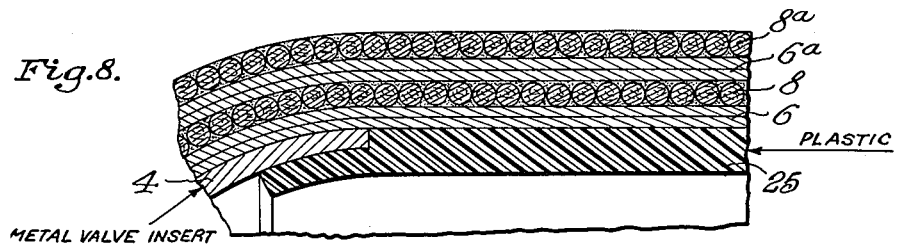
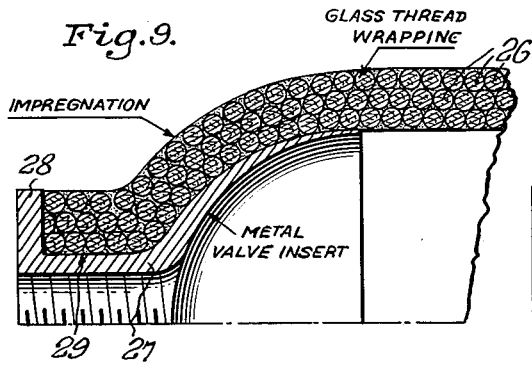
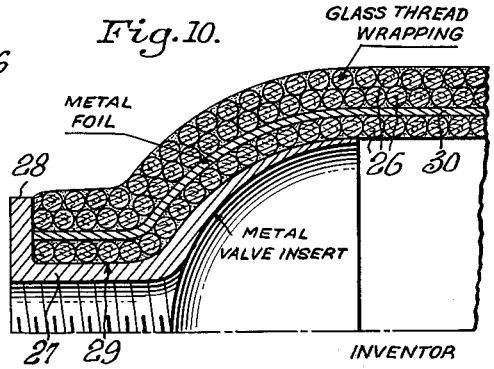

2,744,043

METHOD OF PRODUCING PRESSURE CONTAINERS FOR FLUIDS

Einar M. Ramberg, Bethlehem, Pa., assignor to Fels & Company, Philadelphia, Pa., a corporation of Pennsylvania Application January 23, 1950, Serial No. 140,101

3 Claims. (Cl. 154—83)

This invention relates to methods of producing containers for fluids including liquids and gases, and more particularly vessels or containers for transporting or storing liquids or gases under pressure.

Containers made by the method of the invention have special applicability for such uses as storing or transporting gases, e. g., oxygen or hydrogen, under high pressures. Vessels most generally now used for these and analogous purposes conventionally are constructed as elongated steel cylinders, the physical characteristics of which necessitate the use of a high ratio of container weight to volume in order to withstand rough handling and internal stresses due to the pressure of the contained fluid. The high weight factor is uneconomical from the standpoints of both cost of manufacturing the containers and cost of shipping and handling them. Moreover, such vessels of conventional construction are highly subject to fragmentation when struck by projectiles or falling articles while under internal pressure, or when subjected to other failure-producing forces. Another disadvantage of such conventional vessels is their inherent susceptibility to corrosion.

A general object of the present invention is to provide an improved method for producing containers for fluids so constructed and comprising constituent parts having such characteristics that the difficulties or limitations inherent in containers heretofore used for the same general purposes are eliminated or minimized.

More particularly considered, an object of the present invention is to provide a method of producing a novel vessel or container of the general character referred to comprising a pre-formed end insert and a solid or unified laminated assembly of non-metallic threads having desired properties and a bonding medium impregnating the threads in situ, filling interstices between the threads, and forming therewith a substantially integral, light, strong, gas- and liquid-tight structure subject to minimum corrosion and fragmentation.

In its general nature, a container constructed in accordance with the present invention includes a multiplicity of non-metallic fibrous threads or yarns in laminated arrangement bonded together by a suitable medium such as one of the various plastic resin bonding media now well known and commercially available. Threads or yarns of fibre-glass have been found to possess excellent properties for the purposes of the invention. Fibre-glass thread in itself is now well known and available commercially. Generally considered, it is constituted by a multiplicity of glass or the like fibres, wound, twisted, spun, or otherwise associated to form a filament such as thread, cord, or yarn. Threads of other materials such as nylon, rayon, cotton, and silk may also be used. Containers constructed in accordance with the invention may embody the non-metallic threads in single filament form wound spirally, and may also include laminae of cloth woven or knitted from fibre-glass or other filaments prior to incorporation in the container structure.

In accordance with one preferred procedure for producing containers, laminae of fibre-glass or other suitable threads are applied in mutually superimposed relationship on a removable core, and the laminae are impregnated in situ, as the application of successive laminae proceeds, with a thermosetting plastic resinous bonding medium. The bonding medium fills the interstices in the threads, and the interstices between the threads and between the laminae, so as to form, with all of the thread material, a substantially integral rigid structure. Preferably, at least some of the laminae are applied under linear tension so as to produce a compressively pre-stressed container. Preferably, also, the yarns in different laminations may be in at least two different arrangements, e. g. the yarns in one arrangement may be wound helically with respect to the axis of the core and the yarns in another arrangement may extend at a different angle with respect to the core axis. The assembled laminated structure is then heat-cured, preferably under pressure, at a suitable temperature, for example, in a heated split mold, or by wrapping the container tightly with cellophane tape or similar material which may be unwound from the container after it has been cured. After the initial heat-curing step, the container is removed from the mold, or the cellophane or other pressure-imposing wrapping is removed, and a final wrapping of fibre-glass cord may be applied, which then is impregnated with a plastic resin, afterward cured by the application of heat alone. The core is then removed. Usually it is desirable to incorporate a valve insert or other fitting in the container structure so as to facilitate connection of the container to a valve or line of piping.

It may also be desirable to effect a final impregnation of the assembled structure by a pressure-vacuum process comprising, in general, subjecting the inside and outside surfaces of the container to differential pressures, and applying the impregnating or bonding medium to the surface which is subjected to the higher pressure.

Several representative embodiments of the invention and apparatus which may be used in practicing methods in accordance with the invention are shown in the accompanying drawings, in which:

Figure 1 is a central, longitudinal, sectional view of a container constructed in accordance with the invention positioned in a curing mold and with a central core or form still in the container;

Figure 2 is a view similar to Figure 1 but showing the container alone, without the curing mold and the core;

Figure 5 is a fragmentary, detail, longitudinal, sectional view of the construction shown in Figures 1 and 2, drawn on an enlarged scale;

Figure 3:
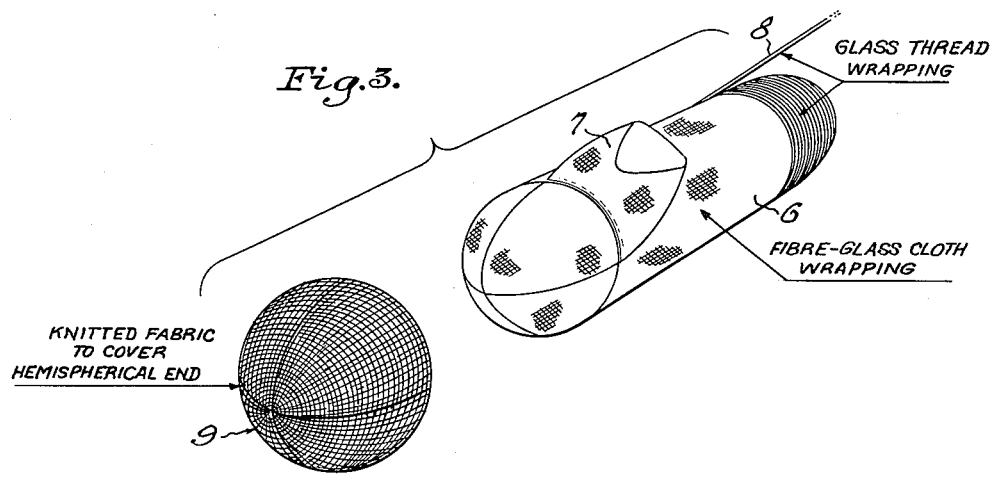
Figure 3 is a schematic perspective view showing the manner in which end parts of cloth laminae are formed so as to fit the curvature of a substantially hemispherical container end, and illustrating also a knitted end cap adapted to be applied to the container end so as to form a continuation of and merge with a lamination constituted by a helically wrapped thread or filament.

Figures 6 to 10, inclusive, are views similar to Figure 5 but showing modifications of the laminated structure;

Figure 11 is a view similar to Figure 2 but showing a container equipped with fittings or inserts at both of the container ends;

Figure 12 is a fragmentary plan view of a part of woven fabric lamination, developed in flat form so as to show the cutting or tailoring of end portions or extensions to be fitted to the hemispherical end of a container with relatively little mutual overlapping;

Figure 13 is a view similar to Figure 12 but showing the end portions or extensions cut or tailored so as to provide for relatively greater mutual overlapping;

Figure 14 is a perspective view illustrating schematically the subjecting of a container assembly to external pressure by wrapping it with a tape or band under tension;

Figure 15 is a schematic view, partly in vertical section and partly in elevation, showing apparatus for effecting pressure-vacuum impregnation of a laminated container structure;

Figure 16 is a plan view of a container constructed in accordance with the present invention and in the form of a tore, a part of the container construction being shown as broken away;

Figure 17 is a view similar to Figure 16 but showing a spherical container constructed in accordance with the invention; and Figure 18 is a view similar to Figure 2 but showing a container including a rim or flange-like protuberance constituted by laminations formed integrally with the laminations constituting the container proper.

Figures 1 and 2 illustrate a container A made in accordance with the invention, the cylindrical wall portion 1 and end portions 2 and 3 of which comprise laminae of non-metallic thread material, in this illustrative example, constituted by or including threads of fibre-glass. The container also comprises a metallic insert 4 at the container end 3. In constructing the container A, the laminae are wound upon a fusible core B equipped with a threaded stem or rod 5 extending axially from one end of the core, and on which the insert 4 is screwed, the adjacent core end being formed to interfit with the inside surface of the insert as shown in Figure 1. When the core B and insert 4 have been positioned as shown in Figure 1, but not placed in the mold C shown in this figure, the glass thread laminae are applied to the core. In the construction shown in Figures 1, 2, and 3, the laminations immediately surrounding the core B are constituted by a plurality of layers 6 of woven fibre-glass cloth, which may be laid or wound around the cylindrical part 1 without difficulty due to bunching or wrinkling.

To facilitate the application of the fibre-glass cloth 6 to the container ends 2 and 3, and in order to control the sectional thickness of the container end portions, the fibre-glass cloth 6 preferably is cut or slit to produce sector-shaped end extensions 7 as shown in Figure 3. Each of the extensions 7 has its base at the junction of the cylindrical portion 1 and the adjacent end portion, and has its apex or free end adapted to lie in the end of the container. By cutting the extensions 7 to suitable size and shape, they may be applied circumferentially to the core and the pre-formed insert part 4 and may be made to conform smoothly to the shapes of the container ends, to fit with respect to the insert 4, and to overlap to a desired extent to provide controlled increased thickness or section in any desired part of either or both of the container ends. Figure 12 shows several sector-shaped extensions 7ᵃ corresponding to the extensions 7 shown in Figure 3 and which are cut so as to provide for relatively little mutual overlapping and thickening of the container end structure. Figure 13 shows several sector-shaped extensions 7ᵇ cut so as to provide for more mutual overlapping and greater thickening of the container end structure.

As each lamination of cloth is applied, it is impregnated in situ with a plastic bonding medium, preferably a heat-curable plastic resin, which fills the interstices in the cloth itself, and between the successive cloth laminae.

After the cloth laminae 6 have been applied and impregnated, a lamination of spirally wound thread or cord 8 of fibre-glass is applied along the cylindrical portion 1 of the container, with its convolutions lying close together, and preferably is wound under linear tension to produce a resultant compressive stress in the assembled container structure. For facility in manufacture, it is preferred that the winding of the fibre-glass cord 8 be not continued into the hemispherical end portion, because of the tendency of the cord to slip when applied to the hemispherical surface. In order to form a continuation of the laminae 8 extending into the hemispherical section, a knitted fibre-glass fabric end cap 9, pre-knitted to the shape of the hemispherical portion, is provided as shown in Figure 3. The end cap 9 may be knitted with any of a number of known knitting stitches, and should be of such size as to be stressed or tensioned somewhat when applied over the parts 7 of the fibre-glass cloth laminae 6. Thus, the end caps 9 as well as the spirally wrapped cord 8, all of which are in the same lamination, are under initial stress.

The wrapped cord lamination 8 and associated end cap 9 are impregnated in situ with a bonding material which may be of the same kind as that employed for impregnating the laminae 6.

In the form shown in Figure 1, the lamination constituted by the fibre-glass thread wrapping 8 and end cap 9 is surrounded by additional laminae 6ᵃ of fibre-glass cloth. These may have tailored sector-shaped end extensions similar to the extensions 7 previously referred to. Again, the laminae 6ᵃ are impregnated in situ, and, finally, an outer lamination or cover comprising spirally wound fibre-glass thread 8ᵃ and an end cap 9ᵃ is applied and impregnated in situ.

The valve insert 4 is formed with an outer surface 10 which is curved convexly so as to converge toward a neck 11 at the axis of the container. The inner surface 12 of the insert is substantially hemispherical, and the walls of the insert diminish in thickness progressively from the neck 11 toward the hemispherical end 2 of the container. This varying section or thickness of the insert walls renders the container structure stronger at the regions where greatest stress will occur. The insert 4 is formed with an annularly recessed part 13 surrounding the neck 11, and into which all but the outermost of the thread laminae extend so as to provide an interlocking joint preventing the material from slipping off the end of the container during application of the laminae. The interlocking of the yarns and the pre-formed part 4 is provided by circumferentially applying yarn material to the part 4 radially inwardly of the radially outermost part of the part 4, thus preventing relative movement of the yarn material and the insert 4 axially of the core B.

When the assembly comprising the insert 4 and the several thread laminae has been formed in the manner explained above, it is inserted in the split mold C, and the mold halves 14—14 are brought together, so that the thread assembly is held snugly and under pressure in the mold matrix 15. The mold is formed with an axial opening 16 through which the threaded positioning rod or stem 5 extends when the mold is closed. The assembly is cured at a temperature, under a pressure, and for a time dependent upon the characteristics of the bonding material. After being cured in the mold under pressure and at elevated temperature, the assembly is removed, and a final outside covering or lamination of thread may be applied in the manner previously described, and impregnated in situ with the bonding material. The outer impregnated lamination may then be cured by the application of heat alone, and the core 8 then removed.

Figure 4:
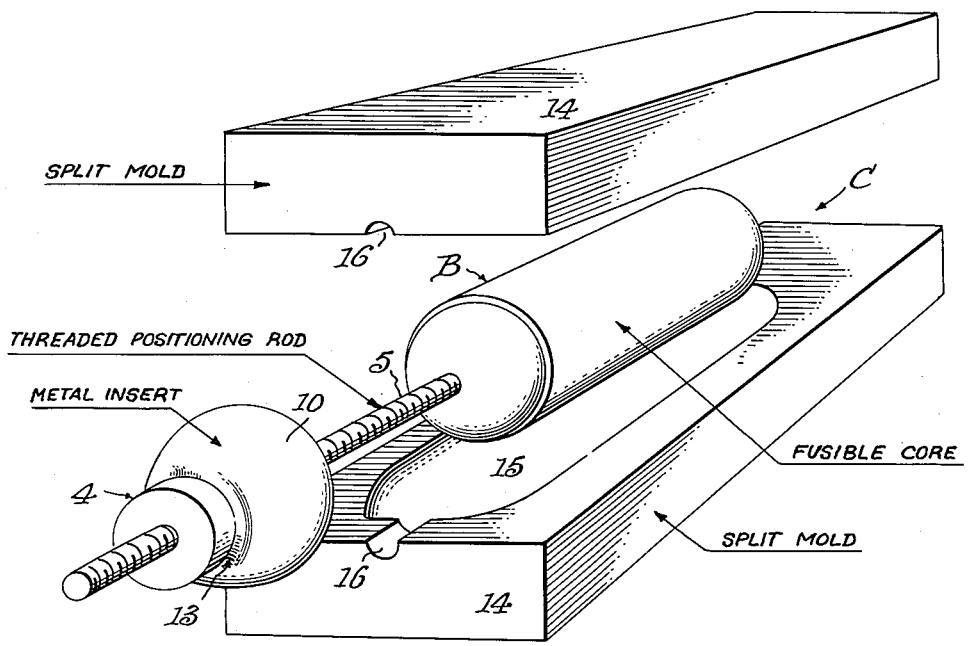
Figure 4 is a perspective view of the curing mold, core and a metal valve insert, the assembly not being shown in this view.

The core shown in Figures 1 and 4 is formed of a readily fusible metal, and may be removed by the application of heat at a temperature above its melting point but not high enough to damage the laminated fibre-glass structure. Good results may be obtained by using a rubber or other flexible sac core, which may be inflated to the desired form before the application of the fibre-glass laminae, and may be deflated to enable its being removed.

Finally, the container may be subjected to a further impregnation to eliminate the possibility of any residual porosity. Preferably, this is accomplished by a fluid pressure-vacuum impregnation process in which the inside and outside surfaces of the assembled container are subjected to differential fluid pressures, and the impregnating or bonding medium is applied to the surface which is subjected to the high pressure. Figure 15 shows schematically one form of apparatus for effecting such a pressure-vacuum impregnation. The container A is positioned in a closed chamber 17 with the container valve insert 4 screwed on the inner end of a pipe 18 projecting into the chamber 17. Impregnating fluid is supplied to the pipe 18 under pressure, e. g., of the order of 2,000 lbs. per square inch, as indicated by a gauge 19, so as to act on the inner walls of the container A. A pipe 20 leads from the chamber 17 to a vacuum pump (not shown) which evacuates the chamber to about 14 lbs. per square inch vacuum as indicated by a gauge 21, thus providing negative fluid pressure creating the desired pressure-vacuum differential, and effecting supplemental impregnation of the container. The container may then be removed from the chamber and emptied of the impregnating fluid.

When a split mold of the kind shown in Figures 1 and 4 is to be used in curing the container under pressure, the container should be built to particular outside dimensions relative to the mold matrix size, and care should be used in closing the mold so as not to injure the container wall structure by pinching it, rubbing it, or by applying unequal pressures at different parts. An alternative method of applying the required pressure without the use of a pre-formed mold is to wrap the container spirally with a removable tape or band 22 of sufficiently strong material under tension, as shown in Figure 14. The tightly wrapped tape 22, in effect, constitutes a pressure-exerting mold which may be applied and later removed without danger of pinching, rubbing, or otherwise damaging the container. The wrapping or molding tape may be of cellophane or other suitably strong material which is resistant to reaction with the impregnating medium, is sufficiently flexible to conform to the shape of the container without wrinkling, and is capable of retaining its form and tensioned condition when subjected to the curing temperature.

The method of forming a container described above lends itself admirably to varying or controlling the section thickness at different parts of the container so as to provide the greatest strength where the greatest stresses are to occur. Thus, a section of increased thickness preferably is formed at the zones 23 indicated in Figure 2 as being substantially in and adjacent the curved end portions of the container. The thickening of section may be accomplished by overlapping extensions 7, 7ᵃ, or 7ᵇ or by applying additional threads in these zones of relatively short extent longitudinally with respect to the container.

Figure 5 shows a portion only of a construction which is the same as that shown in Figures 1 and 2, with the exception that the outer series of woven fiber-glass fabric or cloth laminae 6ᵃ includes three laminae instead of the two laminae 6ᵃ shown in Figures 1 and 2.

Figure 6 shows a similar construction which differs from those described above, however, in that it includes a lamination of metal foil 24, two inner fiber-glass cloth laminae 6, three outer fibre-glass cloth laminae 6ᵃ, and inner and outer fibre-glass cord laminae 8 and 8ᵃ. The foil liner 24 is shown as of exaggerated thickness. In practice it should be thin and flexible, and may be used in order to resist the corrosive action of certain gases or fluids and to provide additional insurance of non-porosity of the inner wall.

Figure 7 shows a construction similar to that illustrated in Figure 6 with the exception that the metal lining lamination 24ᵃ is thicker than the foil lining 24 in Figure 6, and is formed integrally with the insert 4.

Figure 8 shows a construction similar to Figure 6, but in which the inside of the container is formed by a liner 25 of plastic or other suitable material on which the inner series of woven fibre-glass fabric laminae 6 is applied.

Figure 9 shows a modified construction in which the entire fibre-glass thread assembly is constituted by adjacent laminae 26 of fibre-glass cords which are impregnated and bonded in the manner previously described. In this construction, the insert 27 is provided with an end flange 28 which is spaced from the curved outer surface of the insert so as to provide an intervening recess 29 which receives the endmost convolutions of the fibre-glass cord wrapping.

Figure 10 shows a construction similar to that shown in Figure 9, differing therefrom only in that a lamination of foil 30 is interposed between two of the fibre-glass cord laminae 26.

Figure 11 shows a construction the same as that shown in Figure 2, with the exception that the Figure 11 construction includes inserts 4 at both ends of the container.

Although the material used and the pressures and temperatures employed during curing may be varied to some extent, they generally may be considered as being approximated in the following description of a typical procedure which has been used in producing a container or vessel in accordance with my invention and having the desirable characteristics sought. In making a container of the kind shown in Figure 2, the container walls are built up of laminae of fibre-glass thread 0.0016 inch in diameter, and cross woven cloth comprising fibre-glass threads 0.0016 inch in diameter extending circumferentially of the cylinder, and cotton threads of the same size extending parallel to the cylinder axis. It has been found that the use of fibre-glass threads in combination with cotton or other threads different from fibre-glass minimizes any tendency for the fibre-glass threads to crack where the warp and weft threads cross each other when subjected to curing pressure. The threads, woven cloth, and knitted end caps are impregnated with and bound together by a polyester type resin. The metallic valve insert 4 preferably is formed of stainless steel, and the fusible metal core may be formed of an alloy of bismuth, tin, and antimony. Alternate layers of wound thread and cloth are applied under tension of about 3,000 lbs. per square inch in the threads until approximately 120 percent of the required final wall thickness is built up, the ends 2 and 3 being tailored as previously explained to produce about 20 percent overlapping of the extensions 7, 7ᵃ, or 7ᵇ. The mold is closed under such force as to produce approximately 50 lbs. per square inch pressure on the outside of the container, and the container is cured in the mold at about 300° F. for about one hour. The assembly is then removed from the mold and allowed to "age" for about twenty-four hours, after which a covering of polyester type resin is applied. The container is then cured further at atmospheric pressure and at about 200° F. for about three hours to provide a smooth outer skin or surface. The assembly, still containing the metallic core B, is then heated briefly to about 340° F. for fusing or melting the core metal, which is then drained out and the interior of the container then cleaned completely by a compressed air jet. The container is maintained at about 300° F. for one hour, and then stored in a desiccator for about twenty-four hours to eliminate moisture. It is then pressure-vacuum impregnated with a polyester type resin for about three hours by the use of apparatus as shown in Figure 15 under 2,000 lbs. per square inch pressure inside the container and a vacuum of about 14 lbs. per square inch outside the container. The vessel is then drained and heated for four hours at 300° F., and allowed to cool at room temperature.

The threads embodied in the woven cloth, the knitted end caps, and the circumferential wrapping may, for example, be of fibre-glass, nylon, rayon, cotton, or silk, and preferably should be roughened with nitric acid. Suitable impregnating and bonding media are resins of the polyester type, phenol formaldehyde type, melamine formaldehyde type, and silicone type. The latter may be used especially when resistance to high temperature is required. A suitable resin of the polyester type is Laminac 4134, manufactured by the American Cyanamid Company, of New York, New York.

One of the advantages of containers constructed in accordance with the method of the invention is that their makeup may be varied in manufacture to suit them for services differing with respect to such factors as unit pressures, volumes, corrosiveness of the fluid to be stored or transported, resistance to high temperature, dielectric properties, and shape.

The invention has been described principally with reference to an elongated cylindrical vessel, but it may be practiced also in the building of vessels of other shapes such as the toric vessel 31 shown in Figure 16. The vessel 31 has walls built up of laminae of wrapped threads and woven cloth arranged similarly to the laminae shown in Figures 1 to 3 and 5 to 11, with a metallic valve fitting 32 inserted or incorporated in the structure.

Figure 17 shows a spherical container or vessel 33 formed of thread and cloth laminae and including a valve insert 34. The thread and cloth laminae may be built up and bonded and impregnated in the manner previously described. A spherical vessel has the advantage of providing equal stress distribution throughout the walls.

The method of assembling containers in accordance with the invention also lends itself readily to fabricating container structures of irregular form, or structures of somewhat regular general form but which have ribs, collars, or other protuberances or parts formed integrally with the laminated structure of the container proper for adapting the container to be fitted or fastened to various bases, carrying devices, or other structures such as the inside of a rocket. For example, a container similar to that shown in Figures 1 and 2 may be formed so as to include, as an integral part of its laminated structure, a circumferential rib or flange as shown at 35 in Figure 18. Such a rib may be used for fastening the container to any of a variety of mounting constructions, or, if two such ribs are provided, they may be used as rollers for enabling the container to be moved easily over a floor or other surface.

Containers constructed in the manner described above have numerous other advantages over containers of the conventional metal construction heretofore conventionally used for the shipping and storing of liquids and gases. An outstanding advantage of containers constructed in accordance with the present invention is their lightness as compared to conventional metal containers of comparable capacity. Thus, a standard container made of high quality steel, in accordance with the prior art, and designed to carry commercially two cubic feet water volume of gas at a working pressure of 2,015 lbs. per square inch weighs approximately 120 lbs., whereas a container made in accordance with the present invention and being of the same capacity as to volume and pressure weighs approximately 40 lbs. Consequently, the shipment of fluids can be accomplished with a considerable reduction in dead shipping weight when using the containers embodying the present invention. The lightness of containers made in accordance with the present invention also suits them admirably for use where weight is a major factor, irrespective of expense, for example, in aircraft use and rocket installations.

Another important advantage of containers made in accordance with the present invention is that they do not break into fragments if ruptured because of some unusual impact, or injury. A further important advantage is their adaptability, in manufacture, to being easily lined or otherwise rendered resistant to corrosion. A still further advantage resides in their low coefficient of thermal conductivity, making the containers well suited for adiabatic shipment of fluids. Containers made in accordance with the invention may also be constructed of such materials as to have high dielectric properties.

The sequences of procedural steps described above are representative of the preferred method of practicing the invention, but it is intended that the disclosure be considered as illustrative rather than limitative. It is not intended that the drawings be understood as showing the threads or fabric of any particular size, or number, or to scale.

I claim:

1. The method of making a container for fluid under pressure which comprises applying to a removable core a pre-formed part of a shape to constitute an end insert in the finished container, circumferentially applying over said core and over said pre-formed part a plurality of laminations of non-metallic fibrous yarns in at least two differing arrangements with respect to the longitudinal axis of the core, at least some of said yarns being applied to said pre-formed part radially inwardly of the radially outermost part of said pre-formed part whereby to interlock said yarns and said pre-formed part against relative movement axially of said core, the laminations in one of said arrangements each comprising at least two radially spaced layers of non-metallic yarns helically wound under substantial tension and the laminations in another of said arrangements comprising yarns applied circumferentially at a different angle with respect to said longitudinal axis, binding said yarns in an integral structure with a settable bonding medium and with the laminations overlaying and axially interlocking with said pre-formed part, removing said core and leaving said pre-formed part in the end of and interlocked to said container.

2. The method of making a container for fluid under pressure which comprises applying around a removable core a pre-formed part of a shape to constitute an end insert in the finished container, wrapping over said core and over said pre-formed part at least two radially spaced layers of yarns of glass fibres in helices under substantial tension and applying circumferentially over said core and said pre-formed part at least two layers of yarns of glass fibres at a different angle with respect to the longitudinal axis of the core from said first mentioned layers, at least some of said yarns being applied to said pre-formed part radially inwardly of the radially outermost part of said pre-formed part whereby to interlock said yarns and said pre-formed part against relative movement axially of said core, binding said yarns and said layers together and to the pre-formed part with a heat setting bonding medium, removing said core and leaving said pre-formed part in the end of and axially interlocked to said container.

3. The method of making a container for fluid under pressure which comprises threading onto the stem of a core having a fusible body a pre-formed metallic part of a shape to constitute an end insert in the finished container, circumferentially applying a plurality of laminations over said fusible core body and over and axially interlocking with said pre-formed part to prevent relative movement of said laminations and said pre-formed part, said laminations comprising non-metallic fibrous yarns in at least two differing arrangements with respect to the longitudinal axis of the core, the laminations in one of said arrangements each comprising at least two radially spaced layers of non-metallic yarns helically wound under substantial tension and the laminations in another of said arrangements comprising non-metallic yarns applied circumferentially at a different angle with respect to said longitudinal axis, binding said yarns in an integral structure with a settable bonding medium and with the laminations overlaying and axially interlocking with said pre-formed part, melting said core body, removing said core and leaving said pre-formed part in the end of and interlocked with said container.

(References on following page)

References Cited in the file of this patent

UNITED STATES PATENTS

| Number | Name | Date |
|---|---|---|
| 2,200,162 | De Vulitch | May 7, 1940 |
| 2,227,905 | Keenoy | Jan. 7, 1941 |
| 2,232,366 | Chappell | Feb. 18, 1941 |
| 2,311,613 | Slayter | Feb. 16, 1943 |
| 2,372,738 | Powell | Apr. 3, 1945 |
| 2,372,983 | Richardson | Apr. 3, 1945 |
| 2,376,831 | Stearns | May 22, 1945 |
| 2,411,542 | Ilch | Nov. 26, 1946 |
| 2,436,726 | Moyer | Feb. 24, 1948 |
| 2,449,526 | Dunne et al. | Sept. 14, 1948 |
| 2,455,215 | Beckwith et al. | Nov. 30, 1948 |
| 2,467,999 | Stephens | Apr. 19, 1949 |
| 2,525,469 | Anderson | Oct. 10, 1950 |
| 2,573,361 | Rodgers et al. | Oct. 30, 1951 |
| 2,594,693 | Smith | Apr. 29, 1952 |

FOREIGN PATENTS

| Number | Country | Date |
|---|---|---|
| 903,442 | France | Jan. 15, 1945 |
| 586,183 | Great Britain | Mar. 10, 1947 |
| 627,255 | Great Britain | Aug. 4, 1949 |

OTHER REFERENCES

Howald: "Modern Plastics," February 1946, pages 124 and 125.